No. 842,509. PATENTED JAN. 29, 1907.
O. D. WOODRUFF.
DOUGH MIXER AND KNEADER.
APPLICATION FILED JULY 12, 1906.
2 SHEETS—SHEET 1.
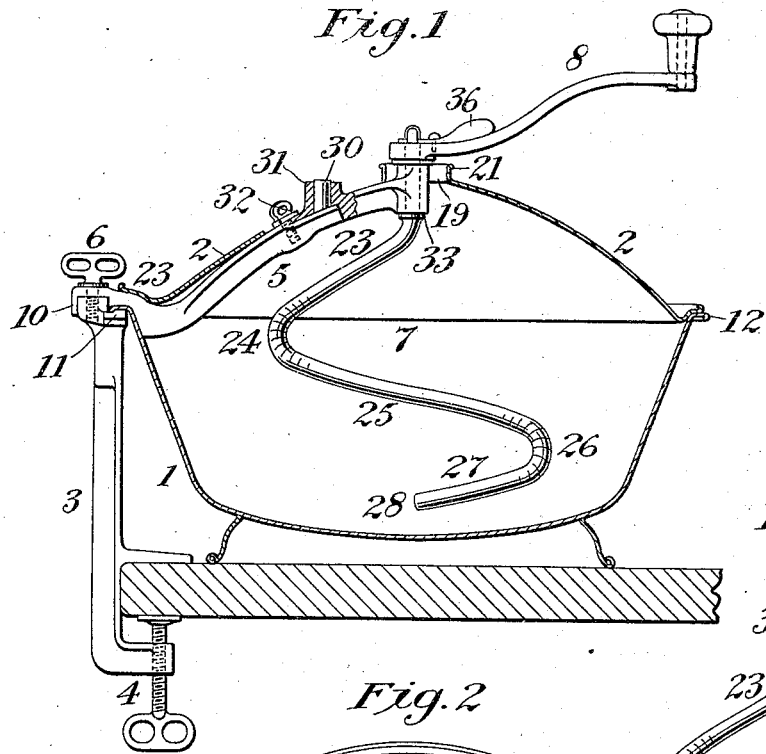
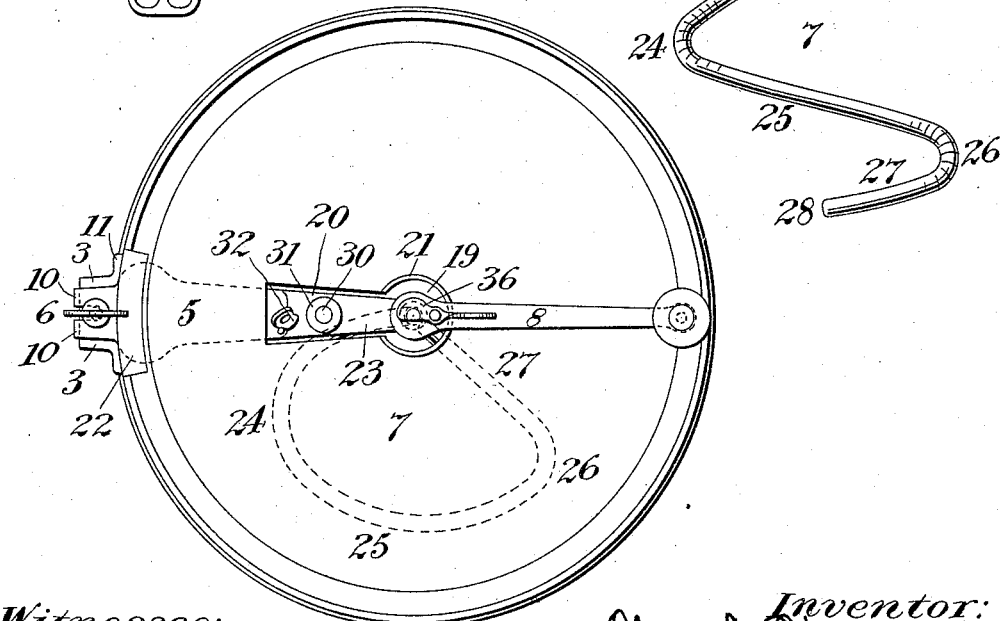
Witnesses:
Chas. D. King.
Wilbur M. Stone
Inventor:
Oliver D. Woodruff
by Albert H. Walker No. 842,509. PATENTED JAN. 29, 1907.
O. D. WOODRUFF.
DOUGH MIXER AND KNEADER.
APPLICATION FILED JULY 12, 1906.
2 SHEETS—SHEET 2.
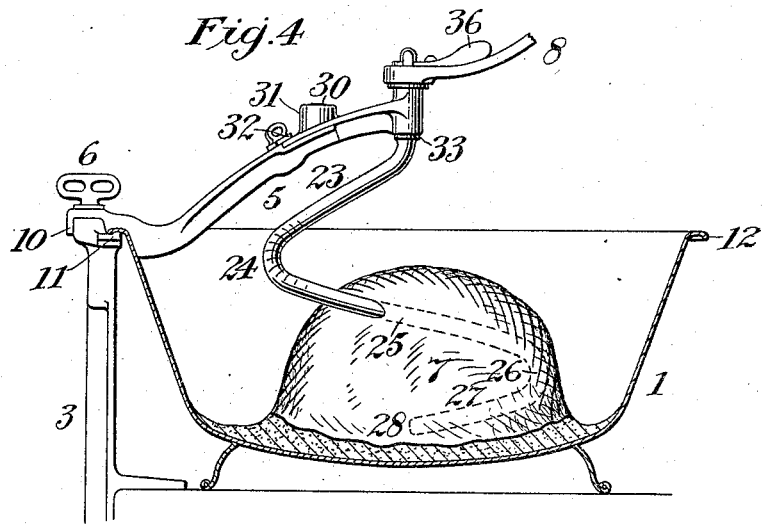
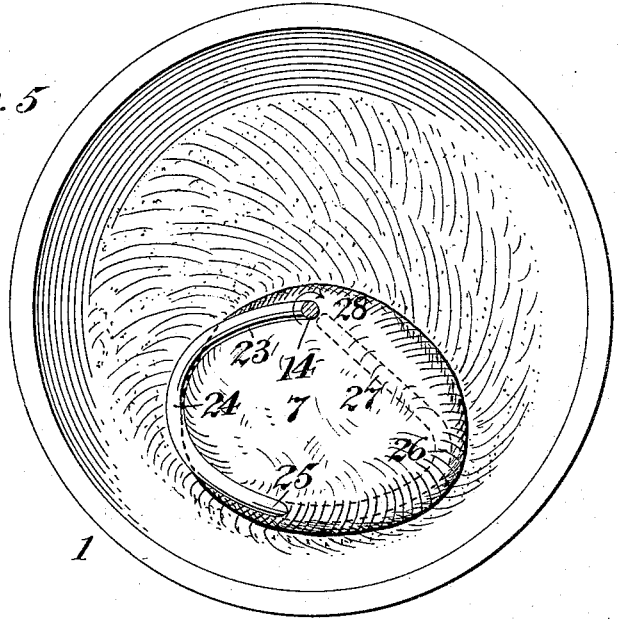
Witnesses:
Chas. W. King
Wilbur M. Stone
Inventor:
Oliver D. Woodruff
by Albert H. Walker Atty

UNITED STATES PATENT OFFICE.

OLIVER D. WOODRUFF, OF SOUTHINGTON, CONNECTICUT.

DOUGH MIXER AND KNEADER.

No. 842,509.  Specification of Letters Patent.  Patented Jan. 29, 1907.

Application filed July 12, 1906. Serial No. 325,745.

*To all whom it may concern:*

Be it known that I, OLIVER D. WOODRUFF, of Southington, Connecticut, have invented a new and useful Improvement in Dough Mixers and Kneaders, of which the following description and claim constitute the specification, and which is illustrated by the accompanying drawings.

This apparatus is a mechanical dough mixer and kneader.

Figure 1 of the drawings is a side elevation of the entire apparatus except that it shows in section the pan and the cover of the pan and a part of a jointed bracket and a segment of the table upon which the apparatus stands and to which it is attached. Fig. 2 is a plan view of the apparatus. Fig. 3 is a side view of the rotor. Fig. 4 is a side elevation of the apparatus except that the cover is absent and part of the crank is broken away and the pan is in section, and this figure also shows a mass of dough being kneaded by the rotor in the pan. Fig. 5 is a plan view of the pan and of the working part of the rotor kneading a mass of dough in the pan.

The numeral 1 indicates a tinned pan. The numeral 2 indicates a special cover for that pan, which is particularly adapted to my apparatus.

The numeral 3 indicates an upright standard clamped to the table by the set-screw 4.

The numeral 5 indicates a radial and approximately horizontal bracket, the outer end of which is attached to the upper end of the standard 3 by the set-screw 6 and the inner end of which supports the rotor 7 and the rotor-crank 8. The outer end of the bracket 5 is bifurcated, as shown in Fig. 2, so that the bracket can be withdrawn from the upper end of the standard 3 when the set-screw 6 is unscrewed through only a part of its length. The outer end of those bifurcations of the bracket 5 are each provided with the downwardly-extending projection 10 for hooking over the upper end of the standard 3, and the upper end of that standard is provided with the segmental shelf 11 for the reception of the beaded edge 12 of the pan 1 when that beaded edge is clamped between the upper end of the standard 3 and the lower side of the bracket 5, as shown in Fig. 1.

The cover 2 is provided with the axial opening 19 and also with the radial opening 20, which extends from the axial opening about one-half of the distance toward the edge of the cover. The axial part of this compound opening is bounded by the segmental flange 21. The outer border of the cover is also provided with the segmental portion 22, which occupies a higher plane than the other parts of that outer border, so as to give room for the bracket 5 between that part of the cover and the beaded edge 12 of the pan 1 without raising the other parts of the annular border of the cover above the beaded edge of the pan. The cover being thus specially constructed can be placed in position upon the pan after the revolving parts of the apparatus are in place by passing the compound opening of the cover over the crank-handle and the crank and then by turning the cover around, if necessary, to bring the radial part 20 of that opening directly over the bracket 5 and then lowering the cover into place, so that the segmental portion 22 of its border will inclose the flat shank of that bracket.

The bracket 5 is preferably made in two parts detachably united by the dowel 30 and the dowel-receiver 31 and the dowel-latch 32. In this case the rotor has its shank 14 provided with the flange 33 below its vertical bearing in the inner end of the bracket 5 and also has the flat surface 34 and the segmental annular groove 35 at the upper end of that shank for engagement with the rotor-crank 8 and the rotor-latch 36, respectively. These parts are assembled by passing the shank of the rotor upward into the vertical bearing in the bracket 5 until the flange 33 reaches the lower side of that bracket, and thereupon placing the hub of the rotor-crank upon the upper end of the rotor-shank and then turning the rotor-latch into the groove 35.

The rotor 7 consists of a rod bent into the approximately helical form shown in the drawings. That helical form consists in the upper reach 23, extending diagonally downward and outward from the axis of the bearing of the rotor, and in the bend 24 below the reach 23, and in the reach 25, extending diagonally downward from the bend 24, and in the bend 26 below the reach 25, and in the reach 27, extending diagonally downward and inward from the bend 26 to the end 28 of the rotor, which end is exactly or nearly exactly in a vertical line with the axis of the shank or bearing 14 of the rotor. The elements 23, 24, 25, 26, and 27 of the rotor thus constitute a somewhat irregular helix, the principal irregularities of which consist in the fact that the reach 27 is approximately straight and is connected to the reach 25 by the comparatively sharp bend 26 instead of constituting with that bend a continuous curve from the reach 25 to the end 28 of the rotor; but its irregularities, though desirable, are not indispensable to the approximately helical rotor.

The general mode of operation of this apparatus is as follows: The upright standard 3 is fixed to the table by means of the set-screw 4. Thereupon the pan is placed on the table with a segment of its beaded edge 12 on the shelf 11 upon the upper end of the standard 3. The outer end of the radial bracket 5 is then placed in the position shown in Fig. 1 upon the upper end of the standard, with its bifurcation astride the shank of the set-screw 6 and with its downward projections hooked over the upper end of the standard. The set-screw 6 is then screwed home, and thus causes the bracket to clamp a segment of the beaded edge of the pan between itself and the upper end of the standard, and thus to firmly hold the pan against the turning tendency which occurs in the use of the apparatus. Thereupon the two parts of the bracket 5 if not already united are fastened together by means of the dowel 30 and the dowel-holder 31 and the dowel-latch 32. The rotor 7 and the rotor-crank 8 are also fixed to the bearing in the inner end of the bracket and are secured there by the rotor-latch 36. Whatever liquid is used in making the dough is then poured into the pan and the flour and the other ingredients of the dough are added thereto, and the cover is placed in the position shown in Fig. 1, as above described. Thereupon the crank is turned a few minutes, so as to rotate the rotor through the contents of the pan. That rotation first mixes the flour and liquid and other ingredients together and then thoroughly kneads those materials into homogeneous dough. The pan and its contents and cover are then left or set in a place of proper temperature to remain there a few hours while the dough is rising. After that rising is finished the crank is again rotated a short time to reknead the dough as much as desired. Thereupon the cover is removed from the pan and the dowel-latch is turned far enough to release the inner part of the bracket 5 from the outer part thereof, and the inner part of the bracket and the rotor-crank are then used to lift the rotor and the dough out of the pan.

The special mode of operation of this apparatus is due to the approximately helical form of the rotor and is as follows: The rotation of the rotor first mixes the flour and liquid and other ingredients together and then gathers those ingredients into a pile, the bottom of which spreads out in every direction over the entire bottom of the pan, as indicated in Fig. 4, while the general mass of which extends upward from that side of the bottom of the pan which is below the rotor, as indicated in Fig. 5. While the rotor continues to be turned in a clockwise direction from the position shown in Fig. 5 around the center of the bottom of the pan, the piled-up part of the dough is carried along with the rotor and is turned over and kneaded as it goes; but the bottom of the pile of dough adheres to the bottom of the pan and operates to restrain the clockwise movement of the dough as against the motion of the rotor. This restraint causes the dough to be pulled by the rotor against the resistance which results from the adhesion of the dough on the bottom of the pan, and that pulling operates to fold the different parts of the dough over and over upon and among each other, and thus to rapidly and thoroughly knead it into the proper consistency and condition.

This apparatus constitutes a valuable improvement upon the dough mixer and kneader which is described and claimed in my Letters Patent No. 815,775, of March 20, 1906. That valuable improvement consists in the difference in structure and in mode of operation between the helical rotor of this apparatus and the loop-rotor of that patent. That difference in structure is apparent in the respective drawings, and the difference in mode of operation between the helical rotor and the loop-rotor is illustrated by the difference between the shape of the pile of dough shown in Figs. 4 and 5 of my present drawings and the pile of dough shown in Figs. 4 and 5 of that patent. That difference consists in the fact that the pile of dough shown in Figs. 4 and 5 of that patent is compacted into a ball around the loop of the rotor without any such extension of that dough over the whole pan as that shown in Figs. 4 and 5 of my present drawings. The reasons why the loop-rotor of my Patent No. 815,775 draws the dough into a ball without allowing the bottom of the dough to spread over the bottom of the pan and to adhere thereto, while the helical rotor of my present apparatus draws the dough into a pile while allowing the bottom of the pile to spread over the bottom of the pan, comprise the fact that the loop-rotor of my Patent No. 815,775 has the long vertical axial reach 23 and the long horizontal reach 29 of that patent and does not have a helical form with a free end over the center of the pan and without any vertical or horizontal reach.

It is not possible to state in words precisely why and how the helical rotor of my present apparatus operates so differently, as it does, from the loop-rotor of my Patent No. 815,775; but my present drawings were carefully made from a specimen of my present apparatus in actual operation kneading dough, and the drawings of my Patent No. 815,775 were carefully made from a specimen of that apparatus actually kneading dough, and the pile of dough with its bottom spreading over the entire bottom of the pan, which is shown in my present drawings, and the ball of dough without any spreading bottom, which is shown in my Patent No. 815,775, do actually and accurately delineate and show the difference between the form and condition of the pile of dough being kneaded by my helical rotor and the ball of dough being kneaded by my loop-rotor, respectively.

The difference in utility between my present apparatus and the apparatus of my Patent No. 815,775 is an important difference in degree, and that difference in degree consists in the fact that my present apparatus kneads a mass of dough with many fewer rotations of the crank than is required to do the same work in the apparatus of my Patent No. 815,775. The increased speed and the diminished labor which are involved in the use of my present apparatus as compared with the apparatus of that patent are due to the fact that the loop-rotor of that patent does not allow the dough to spread out over the bottom of the pan, as does the helical rotor of my present apparatus, and to the fact that that spreading out of the dough over the bottom of the pan much increases the areas of adhesion between the dough and the bottom of the pan and to the fact that that increase of area of adhesion between the dough and the pan operates to much increase the power of the pan to pull back the dough, as against the forward movement of the rotor, tending to pull it forward.

The loop-rotor of my Patent No. 815,775 operates somewhat as if a woman held a mass of dough between her hands and compacted it together like a boy making a snowball, whereas the helical rotor of this specification coöperates with the bottom of the pan to alternately pull apart and then compact a mass of dough much as a girl would use her hands in a candy-pull, first pulling apart and then rolling together the wax-like candy which she handles.

During the last few years I have made many experiments with many different forms of bent rotors in dough mixers and kneaders, and those experiments have proved that among all the forms into which rods can be bent for the purpose of constituting such a rotor only a few are adapted to do the work of mixing and kneading dough. The loop-rotor of my Patent No 815,775 was evolved from a large number of experiments which were conducted by me for the purpose of producing the best form of rotor for a bread mixer and kneader, and I thought when I produced and used that loop-rotor that it was the best form in which a rod could be bent for that purpose. After making that invention and applying for a patent thereon I conducted many additional experiments with a view of producing a rotor which would be superior to that loop-rotor in allowing the bottom of the mass of dough to adhere to the entire surface of the bottom of the pan, and thus to have the previously-unattainable mode of operation, which I have likened to that of a candy-pull. It was in pursuance of many experiments and much study in this direction that I evolved and invented the helical rotor of this specification. I state this history to show that my helical rotor did not result from any extemporaneous bending of a straight rod into a crooked form, but was the result of many months of study and experiment prosecuted with a view to invent the best possible rotor for a dough mixer and kneader.

I claim as my invention—

In a dough mixer and kneader, a helical rotor, having the upper reach 23 extending diagonally downward and outward from the axis of the rotor, and the bend 24 below the reach 23, and the reach 25 extending diagonally downward from the bend 24, and the bend 26 below the reach 25, and the reach 27 extending diagonally downward and inward from the bend 26 to the end 28, which end is exactly or nearly in a vertical line with the axis of the rotor.

OLIVER D. WOODRUFF.

Witnesses:
ALBERT H. WALKER,
HENRY M. TURK.